US010441882B2

(12) United States Patent
Jaouen et al.

(10) Patent No.: US 10,441,882 B2
(45) Date of Patent: Oct. 15, 2019

(54) METHOD AND SYSTEM FOR COOLING AN ELECTRIC MOTOR OF A SIMULATION OR VIDEO GAME CONTROLLER

(71) Applicant: Guillemot Corporation S.A., Chantepie (FR)

(72) Inventors: Jean-Yves Jaouen, Saint Jean la Poterie (FR); Patrick Pennaneac'h, Châteaubourg (FR)

(73) Assignee: Guillemot Corporation S.A., Chantepie (FR)

( * ) Notice: Subject to any disclaimer, the term of this patent is extended or adjusted under 35 U.S.C. 154(b) by 100 days.

(21) Appl. No.: 15/287,452

(22) Filed: Oct. 6, 2016

(65) Prior Publication Data

US 2017/0100665 A1    Apr. 13, 2017

(30) Foreign Application Priority Data

Oct. 7, 2015    (FR) ...................................... 15 59522

(51) Int. Cl.
*A63F 13/245*    (2014.01)
*A63F 13/803*    (2014.01)
(Continued)

(52) U.S. Cl.
CPC .......... *A63F 13/245* (2014.09); *A63F 13/217* (2014.09); *A63F 13/285* (2014.09); (Continued)

(58) Field of Classification Search
CPC .... A63F 13/245; A63F 13/285; A63F 13/217; A63F 13/803; A63F 2300/8017; H02K 9/04; H02K 11/27; H02K 11/25
(Continued)

(56) References Cited

U.S. PATENT DOCUMENTS 5,925,960 A *  7/1999  Hayes ...................... H02K 9/06
                                            29/889.3
7,466,053 B1 * 12/2008  Radev ...................... H02K 1/32
                                            310/114
(Continued)

FOREIGN PATENT DOCUMENTS

CN          2829202 Y       10/2006
DE       102004031399    *   2/2006   ......... H02K 11/0073
(Continued)

OTHER PUBLICATIONS

Mannheim Von Kurt Jäger, "XP-001453926 Fremdbeluftung bei Gleichstrom-Lagerschildmaschinen", BBC-Nachrichten, vol. 10, Oct. 1963, pp. 490-497.
(Continued)

*Primary Examiner* — Michael A Cuff
(74) *Attorney, Agent, or Firm* — Womble Bond Dickinson (US) LLP (57)    ABSTRACT

A method and system for cooling an electric motor of a simulation or video game controller that comprises a rotor arranged in a casing, wherein the method comprises a forced air ventilation from the outside of the casing to the inside of the casing by a fan arranged on the rotor and kinetically decoupled from the rotor. As such, cold outside air is recovered and circulates through the coils which constitute the heat source and expulsed to the other end of the motor. There is therefore a homogeneous extraction of the heat from the coils. As the fan is kinetically decoupled from the rotor, the cooling system therefore operates independently of the speed of rotation of the main shaft of the motor.

20 Claims, 4 Drawing Sheets

(51) Int. Cl.
*H02K 9/04* (2006.01)
*A63F 13/217* (2014.01)
*A63F 13/285* (2014.01)
*H02K 11/25* (2016.01)
*H02K 11/27* (2016.01)

(52) U.S. Cl.
CPC ............ *A63F 13/803* (2014.09); *H02K 9/04* (2013.01); *A63F 2300/8017* (2013.01); *H02K 11/25* (2016.01); *H02K 11/27* (2016.01)

(58) Field of Classification Search
USPC .......................................................... 463/37
See application file for complete search history.

(56) References Cited

U.S. PATENT DOCUMENTS

| | | | | |
|---|---|---|---|---|
| 2003/0194327 | A1* | 10/2003 | Bradbury | F04D 29/384 417/53 |
| 2004/0055142 | A1* | 3/2004 | Moore | H02K 1/265 29/598 |
| 2008/0174546 | A1* | 7/2008 | Schneider | G06F 3/0202 345/156 |
| 2009/0156307 | A1* | 6/2009 | Aguirre | A63F 13/02 463/38 |
| 2009/0295714 | A1* | 12/2009 | Erickson | G06F 1/3203 345/156 |
| 2012/0122571 | A1* | 5/2012 | DeSimone | G07F 17/3211 463/31 |
| 2014/0140872 | A1* | 5/2014 | Stork | H02K 5/20 417/410.1 |
| 2014/0296751 | A1* | 10/2014 | Greenberg | A61H 7/00 601/6 |
| 2016/0120061 | A1* | 4/2016 | Tetsu | G06F 1/20 361/679.48 |
| 2016/0365771 | A1* | 12/2016 | Kokubo | H02P 6/16 |

FOREIGN PATENT DOCUMENTS

| | | |
|---|---|---|
| DE | 102009050693 A1 | 4/2011 |
| DE | 202013001459 U1 | 4/2013 |
| EP | 2806542 A1 | 11/2014 |
| FR | 3000628 A1 | 7/2014 |
| JP | H08107653 A | 4/1996 |

OTHER PUBLICATIONS

GTPlanet.net forum thread titled "Fanatec GT3 Rs V2 . . .My Experience", retrieved Feb. 10, 2015 from URL: http://www.gtplanet.net/forum/threads/fanatec-gt3-rs-v2-my-experience.190477/page.

First Office Action, dated Aug. 22, 2019, issued by SIPO for Chinese patent application No. 201610811441.9.

* cited by examiner

METHOD AND SYSTEM FOR COOLING AN ELECTRIC MOTOR OF A SIMULATION OR VIDEO GAME CONTROLLER

FIELD

This invention relates to an electric motor and more particularly to the cooling of it.

BACKGROUND

Electric motors tend to heat when operating and therefore cooling fins and/or a fan are added therein.

However, motors used to produce force return effects, also called "force feedback" effects, in high-end steering wheels for video games heat up substantially, especially when the user of the steering wheel opposes the forces produced by the motor, for example, when the motor receives an immobility instruction from the shaft of the motor (immobility of the shaft of the motor and therefore immobility of the wheel of the steering wheel), and that at the same time the user insists on rotating the wheel of the steering wheel as these efforts are transmitted mechanically to the motor. Very recently, the motors used to produce the feedback force in high-end steering wheels for video games are brushless motors. In order to prevent the problems caused by the thermal latency, i.e. the time for transmitting the internal heat to the outside and for preventing the temperature from degrading the motor, the forces of the user aren't countered or are countered less which degrades the realism of the force feedback. The power of the motor is under-exploited in order to preserve the lifecycle of the product. This is all the more so critical if the motor has mobile coils therefore farther away from the outer surface of the motor. Consequently, the transmission of the heat was carried out with yet a further delay.

Currently, there are separate solutions used to overcome this problem:

The first is the use of several motors, acting together, instead of a single motor;

The second is the presence of an external fan generally located next to the single motor and which ventilates external cooling fins.

It is also known to integrate a set of blades inside a brushless electric motor on the rotor. But, this set of blades is then fixed to the shaft of the electric motor. And when the motor is blocked, which causes most problems regarding the heating of the coils (to which electric current is supplied for causing the rotation of the rotor), these blades are not functional. These blades can't cool the motor because they don't rotate when the shaft of the motor is immobile.

Using several motors is expensive and complex to implement.

The external fan is not always sufficient to cool the motor and more precisely certain internal zones of the motor. The lifecycle of the motor is then reduced. The fan therefore has to be imposing in order to partially offset its low effectiveness without causing excessive noise. The casing of the steering wheel is therefore not compact. These solutions for cooling via external convection (fan) or by conduction (radiator) do not treat the heat source namely the coil and do not make it possible to homogenously dissipate the heat on each one of the coils. On the other hand, some of the most recent steering wheels have a brushless motor of which the casing is smooth and supplied at the origin without cooling fins. On this casing a tubular part is nested comprising cooling fins extending radially. A fan is then placed vertically at a distance from the motor in such a way that a flow of air circulates over these cooling fins. The oldest steering wheels have a brush motor of which the casing is smooth but on which is fixed a radiator which extends radially. A vertical or horizontal fan is placed at a distance from the motor in such a way that a flow of air circulates on this radiator.

A brushless motor comprising a set of blades fixed to the shaft of the electric motor has the disadvantage of a rotation of the blades identical to the rotation of the shaft of the motor (the blades cannot rotate faster than the shaft, or in the opposite direction). The blades slow down the rotation of the rotor and therefore increase the consumption of the motor. The presence of the fan driven by the motor itself gives the whole a relatively large size.

A patent FR3000628 has attempted to overcome some drawbacks of asynchronous motors which are used to drive a load (the motor shown in FIG. 1 of Patent FR3000628 is an aircraft wheel drive which is suitable for being integrated in the base of the landing gear to permit movement of the aircraft when on the ground in the absence of propulsion provided by the reactors), with limited results (however in such use, the motor shaft isn't blocked when the motor is powered). The patent FR3000628 teaches that a flow of air circulates in an annular space defined by an envelope surrounding the stator of a motor and a casing of the motor. As a consequence, it has the disadvantage of not blowing a flow of air inside of the stator, between the coils; therefor the cooling isn't uniform (the periphery of the winding—i.e. the portion of the winding which is contact with the envelope—is better cooled than the portion of the winding which is close to the magnet) and has low efficiency. It doesn't solve the problems caused by the thermal latency, i.e. here the time for transmitting the internal heat to the envelope for preventing the temperature from degrading the motor. It further has the disadvantage that one of the ends of the motor shaft can't be used because the auxiliary motor driving the fan is placed at one side of the motor casing. Moreover, it is complex due to a number of parts. Finally, the coils of the fan aren't cooled by the flow of air.

SUMMARY

The object of the invention is to propose a solution that is simple, reliable and inexpensive as well that allows for an effective cooling even when the motor is blocked and is heating.

The method for cooling an electric motor according to the invention comprises a rotor and a casing and it is characterised in that it consists of a forced air ventilation from the outside of the casing to the inside said casing by a fan arranged on the rotor and kinetically decoupled from the rotor. As such cold outside air is recovered at an end of the motor in order to be blown directly through the coils which constitute the heat source and expulsed to the other end of the motor. There is therefore a homogeneous extraction of the heat from the coils. As the fan is kinetically decoupled from the rotor, the cooling system therefore operates independently of the speed of rotation of the main shaft of the motor. The fan also operates independently of the rotation direction (clockwise or anticlockwise) of the shaft of the motor. The speed of rotation of the fan depends on the voltage provided to the fan i.e. the voltage provided to the fan determines the speed of rotation of the fan.

Figure 1:
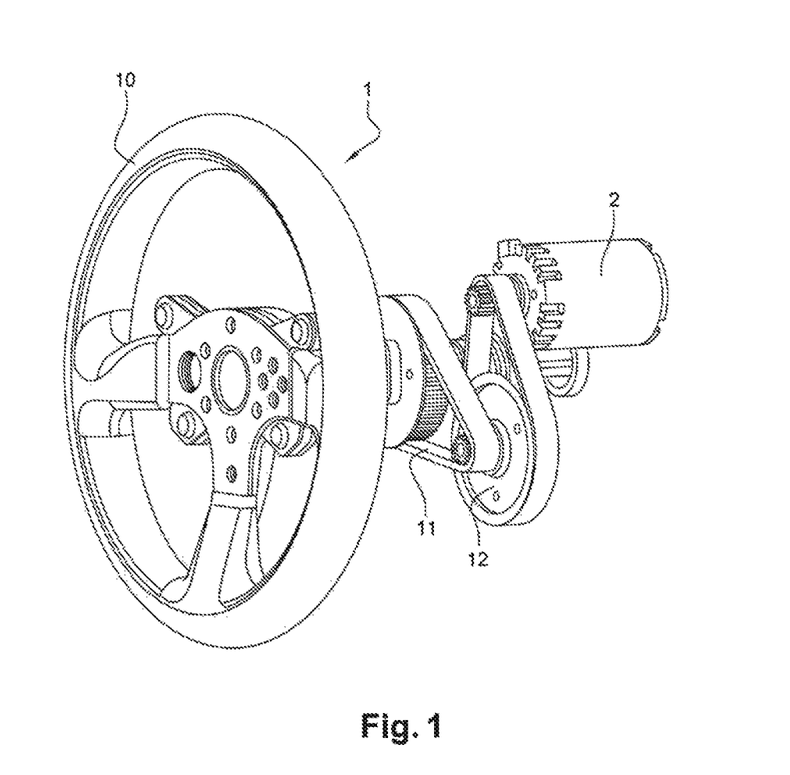
FIG. 1 is a perspective view of a simplified game controller.

Advantageously, the shaft of the motor axially extends through the casing of the motor. The shaft includes two ends (first and second ends). A steering wheel is coupled to the first end of the shaft (left end as viewed in FIG. 1) and, at the second end of the shaft (right end as seen in FIG. 1), a sensor measures the rotation of the shaft.

Advantageously, a sensor measures the temperature inside the motor and this temperature determines the speed of rotation of the fan. According to the temperature detected, the fan will adapt its speed of rotation. The fan can otherwise rotate permanently, or it can have a speed of rotation variable according to the temperature measured on the coils (winding) of the motor by the intermediary of a thermistor (NTC negative temperature coefficient or PTC positive temperature coefficient).

Advantageously, a current sensor measures the current consumed by the motor and this measured current determines the speed of rotation of the fan. The speed of rotation of the fan is adapted according to the current consumed by the motor. The fan can rotate faster if the current consumed increases; or on the contrary, it can rotate more slowly if the current consumed decreases. The measurement of the current can be taken by inserting a resistance in series on the power supply of the motor (by measuring the voltage at the terminals of this resistance or by measuring the temperature of this resistance) or by the intermediary of a Hall effect sensor placed in the vicinity of one of the wires of the power supply of the motor. The measurement by the Hall effect sensor is precise and reliable.

Advantageously, a position sensor (rotation sensor) senses the rotation of the rotor in such a way that the speed of rotation of the rotor can be determined, and this speed determines the speed of rotation of the fan. The angular detection of the steering wheel is carried out by the intermediary of a potentiometer, an optical sensor or a Hall effect sensor that measures the angular position of the steering wheel. The measurement can be taken directly in the shaft of the steering wheel or on an intermediate stage linked to the rotation of the steering wheel (ratio of the intermediate wheel or shaft of the motor). Taking the measurement directly on the shaft of the motor further enables to adjust the phases of the motor because the Hall effect sensor offers great precision. The pass-through shaft offers two free ends and makes it possible, for example, to place a pinion at one of the ends of the shaft, and at the opposite end of the pinion, an element of a Hall effect detection unit (magnet on shaft) associated with a Hall effect sensor on a PCB (Printed Circuit Board) fixed to the casing of the motor. The magnet can be incorporated into the pinion; however, this solution complicates the mounting (due to the belts which cooperate with the pinion and due to this printed circuit board), as it is easier to mount a sub-assembly i.e. a motor for which the shaft carries a magnet and which has a printed circuit board fixed to the casing of the motor.

The invention also relates to an electric motor comprising a stator and a rotor mobile in rotation about an axis xx', a casing and at least a mobile fan in rotation about an axis yy', it is characterised in that the said at least one fan communicates with the inside of the casing and that the said at least one fan is kinetically decoupled from the rotor. The rotation of the rotor and of the fan can as such take place independently. It is as such possible to have a shaft passing through the casing which allows one end of the shaft to be in direct or indirect liaison (via a system of pinions and belts, for example) with a grasping member (wheel of a steering wheel, for example). The other end of the shaft can have a position sensor of the shaft.

A longitudinal interior motor space into the casing of the motor contains the said at least one fan which is mobile in rotation about the axis yy'. The longitudinal interior motor space of the casing of the motor is a substantially cylindrical space which extends longitudinally along the axis xx' inside of the casing of the motor. The longitudinal interior motor space contains in particular the coils of the motor and a portion of the shaft of the motor (the other portions extend outside of the motor because the shaft passes through the casing).

According to a first embodiment, the fan comprises a fan rotor and a fan stator arranged in the casing of the motor. The fan is in the longitudinal interior motor space inside of the casing of the motor. In this operating mode, the cold air is recovered at the vicinity of an end of the motor in order to be blown through coils (the air is forced to circulate longitudinally i.e. substantially parallel to the axis xx' between the coils) and expulsed to the other end of the motor. As such, heat is extracted from the coils directly, effectively and homogeneously. This provides independence to the internal fan which allows the motor to retain the advantage of a homogeneous cooling of the coils with a good cooling even at low or zero rotation speeds of the motor. The fan neither brakes nor stops the rotation of the rotor of the motor. It can be considered to also arrange an annular space between the coils of the motor and the casing of the motor so that a second cooling flow circulates between the coils and the casing of the motor, with the first cooling flow circulating between the coils, this can for example entail a flow of air coming from the same fan.

Advantageously, the fan is kinetically decoupled from the shaft of the motor. The axis yy' of the fan is substantially coaxial to the axis xx'. The motor and the fan can be arranged on the same shaft, preferably the one of the motor, but the fan is kinetically decoupled from the shaft of the motor. There is as such forced ventilation inside an electric motor in order to regulate its internal temperature, thanks to the integrated fan. The body of the electric motor may comprise openings arranged on one side of the casing for the inlet of cold air and several vents arranged in the circumferential direction of the casing on the other side of the casing for the outlet of the hot air. Alternatively, the openings may be arranged in the circumferential direction of the casing proximal to an end of the casing of the motor for the inlet of cold air and the vents may be arranged in the circumferential direction of the casing on the other side of the casing for the outlet of the hot air. The coils of the motor are regularly spaced so that cooling ducts are formed between the coils. The cooling ducts between the coils are substantially longitudinal (parallel to the xx' axis) from first coils heads, then along the coils, to second coils heads. Accordingly, the air circulates in cooling ducts which are arranged substantially at the same distance (radius) of the axis xx' and in directions which are substantially parallel to the axis xx'. The cooling is uniform because the cooling ducts are equiangular arranged (uniformly spaced around the axis xx').

The internal fan forces the air to penetrate into the casing of the motor and to enter in all the cooling ducts (from an end of the ducts which is close to winding head to the opposite end of the ducts which is close to opposite winding head) between the coils, circulate between the coils of the motor (into the ducts), and to escape to the ducts at the other ends of the ducts). The hotter air then escapes via the vents. The coils of the fan are independent from the coils of the motor.

Advantageously, the set of coils of the motor is arranged coaxial to the axis xx' and the fan is arranged coaxial to the axis xx'. The distance is identical between the fan and the winding of said motor. As the gap between the winding and the fan is identical, the displacement of air from the blades of the fan to the winding head is identical for each of the coils heads of this winding head.

The coils of the motor may be arranged in an envelope mounted coaxial to the axis xx'. This envelope forms housing and spacers for each of the coils of the motor. The walls of the spacers of the envelope form cooling ducts for the circulation of air.

Advantageously, the fan rotor is connected to the axis xx' by a ball bearing. The shaft of the motor is mobile in rotation with respect to the casing of the motor thanks to bearing placed between the casing and the shaft of the motor. The coils of the fan may be fixed or mobile with respect to the casing of the motor. The set of blades of the fan is mobile in rotation with respect to the shaft of the electric motor. Bearings are placed between the set of blades and the shaft of the motor. The set of blades includes magnets that allow it to be set into rotation when current passes through the coils of the fan. The fan is coaxial with respect to the shaft of the electric motor and mounted on bearings in such a way that it can rotate independently of this shaft. Consequently, even when the shaft of the motor is immobile, the fan can continue to rotate in order to cool the motor. The fan can also rotate at a speed that is different from that of the shaft of the motor or rotate in the opposite direction. The coils of the fan are also well cooled, in the same way as those of the motor.

The fan stator comprises a fixed winding with respect to the casing and the casing comprises at least one opening that extends in a substantially orthogonal plane with respect to the axis xx' in order to allow entry of the cold outside air in the casing for the forced circulation of the outside air in the casing.

It is possible to circulate inside the motor a liquid or a gas other than air in order to cool the motor.

It is also possible to provide the casing with cooling fins that extend radially.

Advantageously, at least one additional fan kinetically decoupled from the rotor of the motor is arranged below the casing of the motor.

Advantageously, at least one additional fan, comprising a second fan rotor and a second fan stator, is arranged at the bottom of the casing of the motor and the second fan stator is fixed to the casing of the motor. This additional fan sucks cold outside air which is below the motor and blows the cold air upwards so that the cold air circulates on the outer surface of the casing of the motor (and on the surface of the cooling fins, if any).

According to a second embodiment, at least two fans are involved to cool the motor. A first fan is arranged in the casing of the motor and a second fan is arranged outside the longitudinal interior motor space of the casing of the motor.

The first fan comprises a first fan rotor and a first fan stator. The motor and the first fan are arranged on the same shaft, preferably the one of the motor, but the first fan is kinetically decoupled from the shaft of the motor.

The first fan comprises a winding and an opening is arranged in the casing of the motor in vicinity of the winding of the fan. Accordingly, the opening may be close to a winding head of the motor (and close to the coils heads of this winding end).

The casing of the motor has an opening facing a second fan. The second fan is kinetically decoupled from the shaft of the motor.

The second fan is positioned in another direction than that of the motor and outside of the casing. The casing of the motor comprises an opening through which the cold air enters and which is arranged facing the second fan. The coils of the second fan are independent from the coils of the motor.

The second fan, comprising a second fan rotor and a second fan stator, directs and forces the airflow substantially radially to the axis xx' through the opening of the casing (therefore entry and circulation of cold outside air). The second fan can be arranged substantially radially to the axis xx'. The second fan is provided in the vicinity of an end of the motor. The axial center of the rotary spindle of the second fan is allowed to extend orthogonally to the axis of the motor shaft.

The second fan extracts outside cold air and forces it through the opening which faces the airflow directed by the fan. The direction of the airflow blown through the opening can be either substantially orthogonal (orthogonal doesn't imply that things always intersect) or substantially parallel with respect to the axis of rotation yy' of the first fan. However, the direction of the airflow blown through the opening is substantially radial with respect to the axis of rotation xx' of the motor.

The second fan rotor and second fan stator can be arranged substantially radially to the axis xx' (in case of axial-flow fan i.e. in case of airflow substantially parallel with respect to axis yy' of the fan) and the casing has an opening facing the fan. The fan rotor and fan stator can be arranged differently, for example substantially parallel to the axis xx' (in case of airflow substantially orthogonal with respect to axis yy' of the fan).

The opening faces the fan so that the cold air blown by the second fan enters in the casing of the motor through the opening.

Advantageously, the cold air is sucked by the second fan from outside the motor, then circulates through the coils of the second fan, then through the opening, then the cold air is sucked by the first fan through the coils of the motor, then the hotter air escapes via the vents.

The coils of the first and second fans are independent from the coils of the motor.

The first fan rotor is connected to the axis xx' by a ball bearing. The shaft of the motor is mobile in rotation with respect to the casing of the motor thanks to bearing placed between the casing and the shaft of the motor. The coils of the first fan are fixed with respect to the casing of the motor. The set of blades of the first fan is mobile in rotation with respect to the shaft of the electric motor. The set of blades of the first fan includes magnets that allow it to be set into rotation when current passes through the coils of the first fan. Consequently, even when the shaft of the motor is immobile, the first fan can continue to rotate in order to cool the motor. The first fan can also rotate at a speed that is different from that of the motor or rotate in the opposite direction. The coils of the first fan are also well cooled, in the same way as those of the motor.

The set of blades of the second fan includes magnets that allow it to be set into rotation when current passes through the coils of the second fan.

The speed of rotation of the second fan can be different from the speed of rotation of the first fan. The speed of rotation of the second fan can be different from the speed of rotation of the motor.

The first fan and the second fan can be activated selectively (eg. either, simultaneously, alternately, etc.).

The axis yy' of the first fan is substantially coaxial to the axis xx'. The first fan is mounted on bearings in such a way that it can rotate independently of this shaft. The bearings are placed between the set of blades of the first fan and the shaft of the motor. As a consequence, the first fan is coaxial with respect to the shaft of the electric motor.

The first fan stator comprises a first fixed winding with respect to the casing and the casing comprises at least one opening that extends in a substantially orthogonal plane with respect to the axis xx' in order to allow entry of the outside cold air in the casing for the forced circulation of the outside air in the casing.

The second fan rotor and the second fan stator are arranged in a box which is itself connected to the casing of the motor. The coils of the second fan are arranged in the box.

The second fan may be arranged at the bottom of the casing to suck cooler air which is below the casing of the motor. In such case, advantageously, the opening facing the second fan, and the box in which the second fan is arranged, are placed at the bottom of the motor.

The second fan may be arranged at the top of the casing to extract hotter air from the interior of the casing of the motor. In such case, advantageously, the opening facing the second fan, and the box in which the second fan is arranged, are placed at the top of the motor.

Advantageously, the second fan is extracting air.

When the second fan is arranged at the bottom of the casing, the second fan extracts cold outside air (in order to help entry of cold air into the casing of the motor) and the first fan extracts hot air from the motor (in order to force hotter air to escape through the vents of the casing of the motor).

When the second fan is arranged at the top of the casing, the second fan extracts hot inner air (in order to help escape of hot air from the casing of the motor) and the first fan extracts hot air from the motor (in order to force hotter air to escape through the vents of the casing of the motor).

Advantageously, the first fan is extracting air. The first fan extracts hot air from the winding of the motor.

Three fans may be used to force the air ventilation. An air entry fan is arranged at the bottom of the casing to force the entry of cold outside air into the casing of the motor. An air circulation fan forces the circulation of air between the coils of the motor. An air exhaust fan is arranged at the top of the casing to force the escape of hot air from the casing of the motor (i.e. to exhaust hot air from the motor).

Cold air vents are arranged at the bottom of the casing of the video game controller. Hot air vents are arranged at the top of the casing, facing the top of the motor.

The invention also relates to a video game controller which is characterised in that it is provided with an electric motor with at least one of the preceding characteristics. "Video game" means the automobile or aeronautical simulation software—for entertainment or learning—, and "video game controller" any device that makes it possible to control one or several elements of a video game.

BRIEF DESCRIPTION OF THE DRAWINGS

Other advantages can still appear to those skilled in the art when reading the example hereinbelow, shown using the annexed figures, provided by way of example.

DETAILED DESCRIPTION

The video game controller 1 shown in FIG. 1 comprises a steering wheel 10 and a rotating electric motor 2 connected to the steering wheel 10 by a certain number of pulleys 12 and belts 11.

Figure 2:
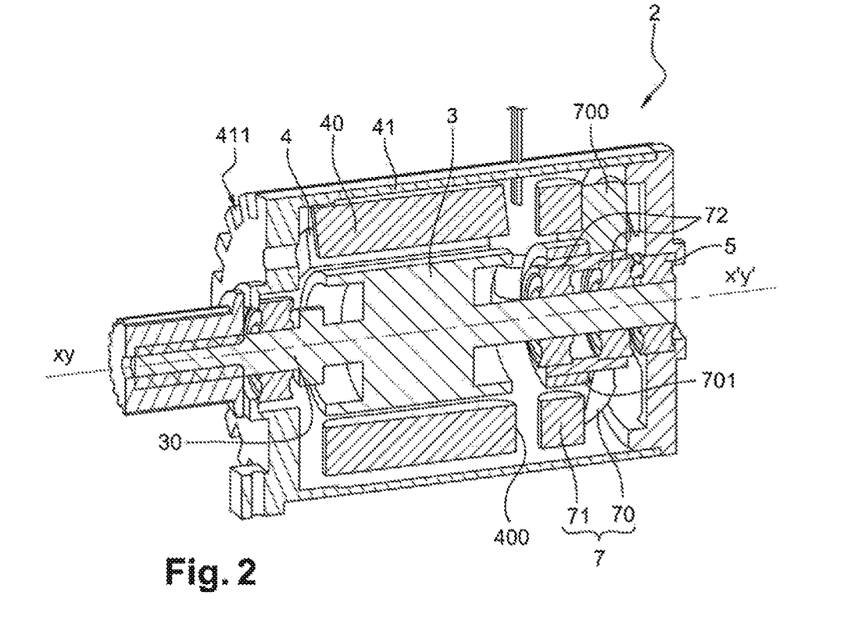
FIG. 2 is a cross-section of the motor according to a first embodiment.

The electric motor 2 shown in FIG. 2 comprises a rotor 3 integral with a shaft 30 of axis xx' and a stator 4 with a winding 40 mounted on a casing 41.

The shaft 30 extends through the casing 41. The shaft 30 has two ends (first and second ends). A steering wheel 10 is coupled to the first end (left end as viewed in FIG. 1).

In the framework of this description, it shall be considered that the rotor and the stator of the motor can be inverted without leaving the scope of this invention. As such, in an electric motor, the coils can be fixed with respect to the casing and the magnet or magnets can be mobile with respect to the casing, and inversely. The references of each one can therefore be inverted in the claims.

The casing 41 comprises a substantially cylindrical inside space wherein are arranged the rotor 3 and the stator 4; and the casing 41 concentrically supports them and maintains them coaxial. The shaft 30 and the casing 41 are connected by bearings 5 allowing for a rotation of one with respect to the other.

Figure 3:
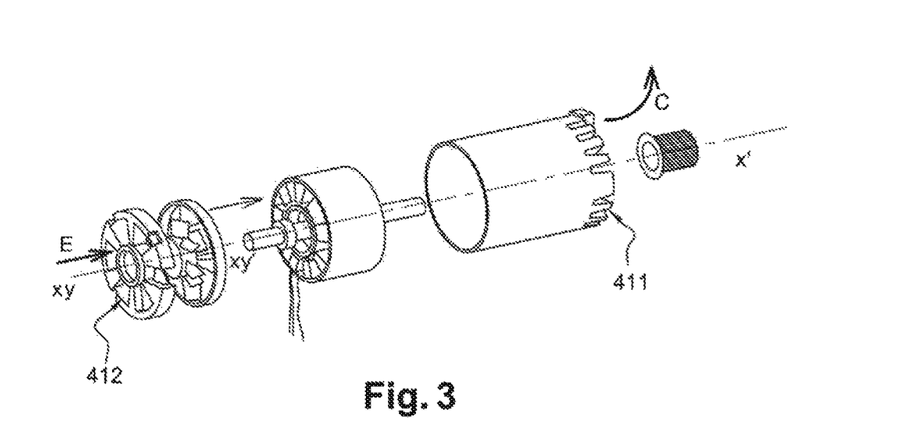
FIG. 3 is an exploded perspective of FIG. 2.

In the first embodiment of FIGS. 2 and 3, the fan 7 includes a set of blades 70 and its own winding 71 integral with the casing 41 of the electric motor 2 (i.e. the coils of the fan 7 are fixed with respect to the casing 41). The fan 7 is concentrically supported by the rotor 3. The fan 7 is rotatably axially supported by the shaft 30 of the motor. The set of blades 70 is connected to the shaft 30 by bearings 72 in order to be able to rotate freely about said shaft 30. The fan 7 is borne by the rotor 3 and is mobile in rotation about the yy' axis with respect to the rotor 3. Accordingly, the fan 7 has only one degree of freedom in rotation with respect to the rotor 3 and one degree of freedom in rotation with respect to the stator 4 too. The fan 7 has no degree of freedom in translation with respect to the rotor 3. The set of blades 70 comprises magnets 701 and blades 700. Here the axis of the fan yy' is coaxial with the axis xx', but it can have a slight inclination with respect to the latter.

The air is forced to circulate to winding 71 of said fan 7. The blades 700 of the set of blades 70 radially extend beyond the magnets 701 in such a way as to at least partially cover the winding 71 in order to improve the cooling therein and in order to have a blade surface that is as large as possible in order to optimise the cooling of the set of coils 40 and 71.

The casing 41 has openings 412 at one of its axial ends and vents 411 at its other axial end. The openings and the vents are distributed at regular intervals radially with respect to the axis xx'. The blades 700 are arranged between the openings 412 and the winding 71.

In this embodiment, the outside air is sucked by the fan 7 (arrows E) into the openings 412, then sent to the winding 71 of the fan, circulates between the winding 71 of the fan, then circulates between the winding 40 of the motor, and exits via the vents 411 (arrows C).

The cooling can be done either by rotating the fan 7 permanently in order to permanently cool the motor and/or by changing its speed when the temperature of the motor measured by a temperature sensor (not shown) reaches a predetermined value, or by turning it on when the temperature of the motor reaches a predetermined value.

Figure 4:
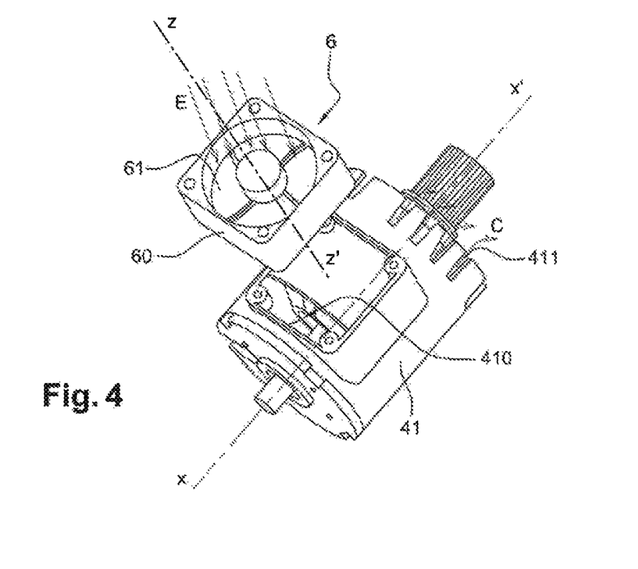
FIG. 4 is an exploded perspective of a second embodiment.

On the second embodiment of FIG. 4, the motor (2) of the first embodiment has a fan 6 and the casing 41 is provided with a lateral opening 410. The opening 410 is arranged radially with respect to the axis xx'. This opening 410 is preferably located in the vicinity of an end of the motor 2, or of a winding head 400. Here, the casing 41 has no opening 412 at one of its axial end (however it has vents 411 at its other axial end).

The fan 6 on an axis of rotation zz' is connected to the casing 41 radially and facing the opening 410, i.e. the axis zz' is substantially orthogonal to the axis xx'. Here, the fan 6 is arranged under the casing in a box 60 and comprises blades 61. The box 60 is fixed to the casing 41 by screws for example.

The casing 41 also has vents 411 arranged at the other axial end of the casing with respect to the opening 410 and distributed at regular intervals radially with respect to the axis xx'.

In this embodiment, the outside air will be sucked by the fan 6 (arrows E) which will send it to the opening 410 then to the set of coils 40 and exit via vents 411 (arrows C).

In the second embodiment, the cooling can be done either by rotating one or more of the fans (6, 7) permanently in order to permanently cool the winding of the motor (2) and/or by changing their respective fan speed when the temperature of the motor measured by one or more temperature sensors (not shown) reach predetermined value(s), or by turning the fan(s) on when the temperature of the motor reaches a predetermined value.

In each of the two embodiments, the fan(s) can be controlled using the measurement of the current consumed by the motor. Indeed, the higher the current consumed is, the higher the thermal power to be dissipated will be. The current consumed by the motor is measured by a current sensor (not shown). The speed of rotation of the fan(s) can as such be controlled according to the current consumed by the motor. When the current consumed by the motor increases, an increase in the internal temperature of the motor is anticipated and consequently the speed of rotation of the fan(s) is (are) increased. The measurement of the current is taken by using a current sensor (a resistance or a Hall effect sensor).

The fan(s) can finally be controlled using the angular measurement of the steering wheel, and the calculation of the speed of the motor. The speed of rotation of the fan can as such be controlled by the speed of the motor. The faster the motor rotates, the slower the fan(s) rotate(s); inversely, the slower the motor rotates, the faster the fan(s) rotate(s).

Any of the types of fans may be used. For example, the fan(s) can be axial-flow fan(s), or radial-flow fan(s) (radial-flow fans are sometimes called centrifugal fans), or cross-flow fan(s).

In case of a radial fan, the casing 41 has openings arranged radially with respect to the axis yy', instead of the (longitudinal) openings 412. These openings radially face the blades of the fan.

The fan 7 can be located at different position longitudinally on the axis yy' (which is coaxial with the axis xx'), for example near the back end of the motor i.e. at the side opposite to the pinion (as shown on FIG. 5) or near the front end of the motor (i.e. near the side where is the pinion). The fan can be arranged at either side with respect to the coils of the motor.

Figure 5:
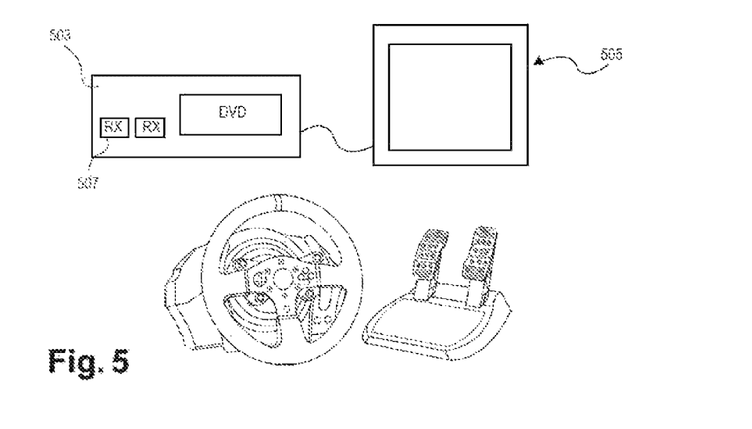
FIG. 5 is a diagram of one embodiment of a system with a game controller.

FIG. 5 is a diagram of one embodiment of a system for a simulation or video game with a video game controller according to the invention. In one embodiment, the video game controller 1 may be connected to a computer system or console device 503. The connection may be a wireless connection or may be a wire line connection. The wireless system may include a transmitting device within the video game controller 1 and a receiving device 507 attached to the computer or console or within the computer or console. A wire line system may use a specialized system or a general standard system such as a USB connection. The computer system may be any personal computer system, workstation or similar system. The system may be a console device such as a Sony, Microsoft, or Nintendo console or similar system. The computer system or console device may be connected to a monitor device such as a television 505, LCD display or similar display device.

Figure 6:
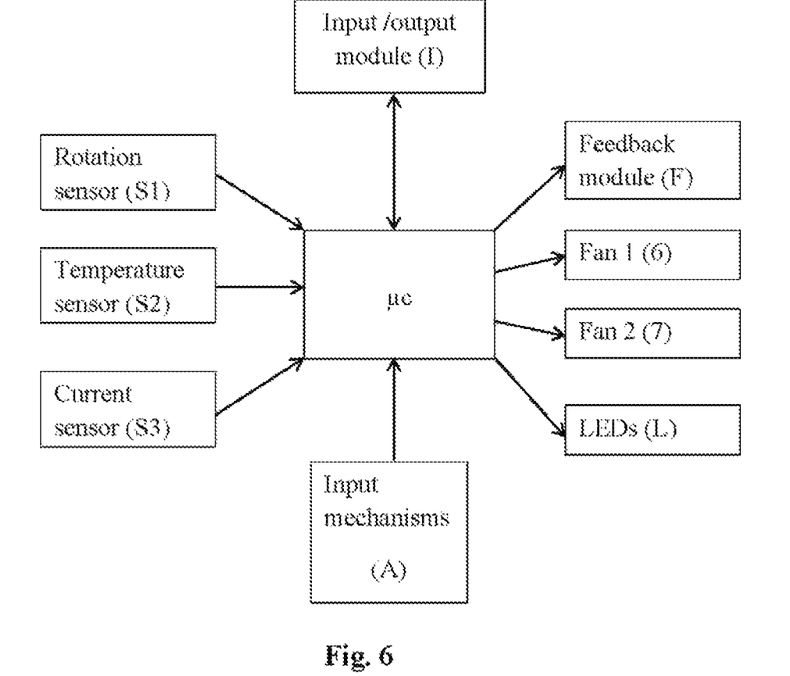
FIG. 6 shows a simplified structure of a game controller according to the invention.

FIG. 6 shows a simplified structure of a video game controller (1) according to the invention.

In one embodiment, the video game controller (1) may include a set of input mechanisms (A). The input mechanisms may include any number of buttons. The input mechanisms may include a cross pad, ministick or similar directional input mechanisms. The game controller (1) may have any number of input mechanisms and any configuration of types of input mechanisms (A).

The input/output module (I) receives internal input signals from the input mechanisms either directly or through microcontroller (μc). The input/output module (I) transforms the internal signals into signals that can be transmitted over a wire or wirelessly to the associated computer system or console device. In one embodiment, the input/output module (I) may transmit a wireless signal to a receiver attached to the console device or computer system. In another embodiment, the input/output module (I) may drive a signal or set of signals over a wire or set of wires to a specialized input port on a console or computer system. In a further embodiment, the input/output module may drive a signal or set of signals over a standard communications system such as a universal serial bus (USB) or similar system to a computer system or console device.

The input/output module (I) receives internal input signals from a rotation sensor (S1) either directly or through microcontroller (μc). The input/output module (I) transforms the internal signals into signals that can be transmitted over a wire or wirelessly to the associated computer system or console device.

In one embodiment, the input/output module (I) may transmit a wireless signal to a receiver attached to the console device or computer system. In another embodiment, the input/output module (I) may drive a signal or set of signals over a wire or set of wires to a specialized input port on a console or computer system. In a further embodiment, the input/output module may drive a signal or set of signals over a standard communications system such as a universal serial bus (USB) or similar system to a computer system or console device.

The input/output module (I) may receive information from an associated computer system or console device. The input/output module (I) may be a receiver for a wireless system or wired system. Information received from the computer system or console may be to direct the operation of the Feedback module via the microcontroller (μc) which embeds a data processing unit and a data storage unit. The feedback module (F) may be a circuit or similar system for driving the motor (2) such as a pulse width modulated (PWM) motor or similar device to generate a feedback sensation to a user. The feedback may be generated in response to the state of the current software application.

In one embodiment, the game controller (1) may include a set of light emitting diodes (LEDs) or similar devices. The LEDs (L) may be utilized to indicate the reception of input from input mechanisms. The LEDs (L) may be used to back-light or retro-light buttons for playing in dark areas. An LED may be activated in a flashing pattern to indicate an increase of heat when the user opposes to the rotation of the wheel of the game controller under the forces caused by the motor (2).

In one embodiment, the game controller (1) may include a fan (7) or a set of fans (6, 7) for cooling the motor (2).

The microcontroller (μc) may receive information from one or more sensors (S1, S2, S3) to determine the heat in the casing of the motor (2) and/or in the shell of the game controller (1) which surrounds a portion of the game controller which is fixed in rotation (such portions including the motor (2), and,—if any—means (11, 12) for transmitting rotational movements generated by the motor to the wheel 10). Information received from the sensors may be to direct the operation of the fans (6, 7). The fans may be activated or their speed increased selectively in response to an actual or anticipated increase of heat.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A method for cooling an electric motor of a video game controller, the electric motor comprising a casing defining an interior motor space, a rotor and a number of motor coils positioned in the interior motor space, wherein the method comprises a forced air circulation between the motor coils, by a fan which is positioned in the interior motor space of the casing, and which is supported by the rotor and is mobile in rotation with respect to the rotor, in such a way that the speed of rotation of the fan is independent from the speed of rotation of the rotor.

2. The method according to claim 1, wherein the fan rotates at a substantially constant speed of rotation.

3. The method according to claim 1, wherein a current sensor measures the current consumed by the electric motor and the current determines the speed of rotation of the fan.

4. The method according to claim 1, wherein the motor coils are spaced to form cooling ducts for the forced air circulation.

5. The method according to claim 1, wherein the air also circulates between fan coils.

6. The method according to claim 1, wherein the air circulates in cooling ducts which are arranged between motor coils and are arranged substantially at the same distance of the axis xx' and in directions which are substantially parallel to the axis xx'.

7. The method according to claim 1, wherein at least one additional fan kinetically decoupled from the rotor is arranged on the casing of the electric motor.

8. The method according to claim 7, wherein the casing has at least an opening for the entry of air and at least one additional fan forces the entry of air to inside of the casing through the opening.

9. The method according to claim 8, wherein the casing has another opening for the escape of air and another fan forces the escape of air from the casing through the another opening.

10. A video game controller having a motor comprising a main motor rotor which is mobile in rotation about an axis xx' with respect to a casing, and a fan mobile in rotation about an axis yy', wherein the fan is arranged on the main motor rotor, into the casing, in that the fan is coaxial with the main motor rotor, and in that the fan is mobile in rotation with respect to the main motor rotor.

11. The video game controller according to claim 10, wherein the main motor rotor bears the fan and in that the main motor rotor extends from the interior of the motor at both sides of the casing.

12. The video game controller according to claim 11, wherein one end of the main motor rotor is directly or indirectly connected to a steering wheel and the rotation of the other end of the main motor rotor is sensed by a rotation sensor.

13. The video game controller according to claim 10 wherein the fan comprises a winding and an opening is arranged in the casing in vicinity of the winding of the fan.

14. The video game controller according to claim 10, wherein a fan rotor is connected to the axis xx' by a ball bearing.

15. The video game controller according to claim 10, wherein at least one additional fan kinetically decoupled from the main motor rotor is arranged at the bottom of the casing.

16. The video game controller according to claim 10, wherein at least one additional fan kinetically decoupled from the main motor rotor is arranged at the top of the casing.

17. The video game controller according to claim 10, wherein at least two additional fans kinetically decoupled from the main motor rotor are arranged on the casing.

18. A method for cooling an electric motor of a video game controller when the motor converts electrical energy into a mechanical couple to tend to cause rotation of a main rotor about an axis xx' and exterior forces substantially oppose to such rotation, the motor having a casing having an opening for entry of sucked air wherein the method comprises a forced air ventilation from the outside of the casing to the inside of the casing, and a forced longitudinal circulation of air between coils of the motor, by at least one fan inside the casing, which is supported by the main rotor and rotatably movable with respect to the main rotor about an axis yy' which is coaxial with the axis xx'.

19. The method according to claim 18 wherein blades of the fan radially extend beyond a magnet of the fan at least as much as the coils radially extend, in such a way to optimise the cooling of the coils.

20. The method according to claim 18 wherein the main rotor and the fan rotor are coaxial.

* * * * *